United States Patent [19]
Wojtowicz

[11] 3,898,223
[45] Aug. 5, 1975

[54] PREPARATION OF ALKALI METAL SALTS OF DICHLOROISOCYANURIC ACID

[75] Inventor: John A. Wojtowicz, Chesire, Conn.

[73] Assignee: Olin Corporation, New Haven, Conn.

[22] Filed: Sept. 4, 1974

[21] Appl. No.: 503,141

[52] U.S. Cl. .......................... 260/248 C; 252/187 C
[51] Int. Cl. ............................................. C07d 55/40
[58] Field of Search ................................. 260/248 C

[56] References Cited
UNITED STATES PATENTS
3,415,823  12/1968  Moore et al. ........................ 260/248

Primary Examiner—John M. Ford
Attorney, Agent, or Firm—Donald F. Clements; Thomas P. O'Day; James B. Haglind

[57] ABSTRACT

Alkali metal salts of dichloroisocyanuric acid are produced by the reaction of trichloroisocyanuric acid with an alkali metal carbonate in the presence of water.

When sodium or lithium carbonates are used, the reaction product is sodium or lithium dichloroisocyanurate dihydrate while potassium carbonate reacts to produce [(monotrichloro) tetra (potassium dichloro)] pentaisocyanurate.

The products are useful as bleaching or sanitizing agents.

15 Claims, No Drawings

PREPARATION OF ALKALI METAL SALTS OF DICHLOROISOCYANURIC ACID

This invention relates to a process for the production of alkali metal salts of dichloroisocyanuric acid. The salts are well known products used in laundry, bleaching and sanitizing applications.

It is known to produce alkali metal salts of dichloroisocyanuric acid by reacting trichloroisocyanuric acid with a salt of cyanuric acid. For example, in U.S. Pat. No. 3,035,057, issued on May 15, 1962, to W. F. Symes and N. S. Hadzekyriakides, two moles of trichloroisocyanuric acid are reacted with a mole of trisodium or tripotassium isocyanurate at a temperature range of 0° to 60° C. and a pH of 5.0 to 8.5. In U.S. Pat. No. 3,150,132, issued on Sept. 22, 1964, to W. Symes, trichloroisocyanuric is reacted with monopotassium dichloroisocyanurate to form a [(monotrichloro) tetra (monopotassium dichloro)] pentaisocyanurate. The molar ratio of monopotassium isocyanurate to trichloroisocyanuric acid is in excess of 4:1 and more preferably between 6:1 and 8:1. The temperature range of the reaction was in the range of 5° C. to 50° C. and the pH was maintained below 6.0 and preferably less than 2.1.

The above processes require as one reactant, a salt of a relatively expensive organic heterocyclic acid, cyanuric acid. The cyanuric salt is prepared by the reaction of cyanuric acid with a base such as sodium or potassium hydroxide under controlled temperature and pH conditions. The reaction with trichloroisocyanuric acid requires similarly controlled pH conditions.

U.S. Pat. No. 3,141,883, which issued July 21, 1964, to Chassaing et al., discloses a process for preparing sodium dichloroisocyanuric acid by mixing dichloroisocyanuric acid with sodium carbonate decahydrate. There is a need at the present time for a simplified process for preparing sodium dichloroisocyanurate from trichloroisocyanuric acid.

It is a primary object of the present inventon to provide an improved process for preparing alkali metal salts of dichloroisocyanuric acid using inexpensive alkali metal carbonates.

Another object of the present invention is to provide a novel process for preparing alkali metal salts of dichloroisocyanuric directly from trichloroisocyanuric acid.

These and other objects of the invention will be apparent from the following detailed description of the invention.

Briefly, the process of the present invention for producing alkali metal salts of dichloroisocyanuric acid comprises reacting trichloroisocyanuric acid with an alkali metal carbonate in the presence of water, and recovering the alkali metal salt of dichloroisocyanuric acid produced thereby.

More in detail, any suitable alkali metal carbonate such as sodium carbonate, sodium bicarbonate, potassium carbonate, potassium bicarbonate, lithium carbonate, lithium bicarbonate, rubidium carbonate, rubidium bicarbonate, and cesium carbonate and cesium bicarbonate. The anhydrous forms as well as the hydrated forms of these compounds may be used. The alkali metal carbonates may be used as a dry solid, a wet solid or as an aqueous solution of the alkali metal carbonate. It is preferred to employ sodium and potassium carbonates because of the availability of these compounds commercially.

The second reactant in the process of this invention is trichloroisocyanuric acid, which may be reacted as a dry solid, wet solid, or as an aqueous slurry.

The reaction is carried out using a molar ratio of trichloroisocyanuric acid to the alkali metal component of the alkali metal carbonate in the range from about 1:0.6 to about 1:2, and preferably from about 1:0.8 to about 1:1.2.

As indicated below, the reaction between the alkali metal carbonate and trichloroisocyanuric acid is carried out in the presence of sufficient water to at least moisten the reactants.

Any suitable reaction temperature may be used, for example, a temperature in the range from about 0° to about 50° C., and preferably from about 20° to about 40° C.

During the reaction, trichloroisocyanuric acid reacts with the alkali metal portion of the alkali metal carbonate to form an alkali metal salt of dichloroisocyanuric acid. Where the alkali metal reacted is sodium or lithium, the product obtained at temperatures in the range of, for example, from about 0° to about 50° C., is a simple salt, e.g., sodium dichloroisocyanurate dihydrate or lithium dichloroisocyanurate dihydrate. By heating the dihydrate or maintaining the reaction at the appropriate temperature, the anhydrous salt or monohydrate, where existent, may be obtained. For example, by heating sodium dichloroisocyanurate dihydrate at temperatures of from about 60° to about 90° C., sodium dichloroisocyanurate monohydrate is obtained. At temperatures above about 90° C., anhydrous sodium dichloroisocyanurate is produced.

When the alkali metal portion of the alkali metal carbonate is potassium, the product formed at temperatures of from about 0° to about 50° C. is a complex salt having one mole of trichloroisocyanuric acid and four moles of potassium dichloroisocyanurate. The product is identified as [(monotrichloro) tetra (monopotassium dichloro)] pentaisocyanurate.

When reacting trichloroisocyanuric acid with sodium bicarbonate, the reaction is believed to proceed according to the following equation:

(1) 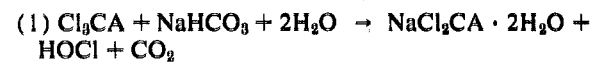
$$Cl_3CA + NaHCO_3 + 2H_2O \rightarrow NaCl_2CA \cdot 2H_2O + HOCl + CO_2$$

where CA represents cyanuric acid.

If potassium carbonate is the alkali metal carbonate, the reaction with trichloroisocyanuric acid is believed to proceed as follows:

(2) 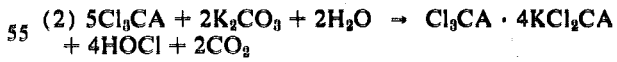
$$5Cl_3CA + 2K_2CO_3 + 2H_2O \rightarrow Cl_3CA \cdot 4KCl_2CA + 4HOCl + 2CO_2$$

Similar reactions occur for the corresponding carbonates of lithium, rubidium and cesium.

Water in an amount sufficient to at least moisten the reactants should be present.

As indicated in equation (1) and (2) above, water is believed to react with trichloroisocyanuric acid to form hypochlorous acid during the reaction. As indicated in equation (2), sufficient water should be present to complete the reaction and form the anhydrous potassium salt product. As indicated in equation (1) above sufficient water should not only be present to only complete the reaction but also to provide water to form the dihydrate sodium salt product.

A suitable amount of water is a molar ratio of trichloroisocyanuric to water in the range from about 1:0.2 to about 1:15, and preferably from about 1:0.4 to about 1:10. Where less water is used, the reaction is incomplete and the product obtained is a mixture of unreacted trichloroisocyanuric acid and the alkali metal salt of dichloroisocyanuric acid. Greater amounts of water may be used, if desired, but must be removed in order to obtain the desired alkali metal dichloroisocyanurate product in solid form.

Agitation of the reaction mixture is desirable during the reaction period to assure admixture of trichloroisocyanuric acid with the alkali metal carbonate and the water present and the release of any gases formed.

Reaction time is not critical and control or adjustment of the pH during the reaction is not required.

During a reaction, where a chlorine-containing gas such as chlorine or hypochlorous acid is released, the chlorine may be recovered, for example, by feeding the gas to a scrubber containing an alkali metal hydroxide or alkali metal carbonate to form an alkali metal hypochlorite; or by reacting the chlorine-containing gas with cyanuric acid or a salt thereof to be used in the production of trichloroisocyanuric acid.

Depending upon the portion of water employed, the reaction mass will range from a wet cake to a slurry. After the reaction is completed, excess water may be removed by heating the wet cake to dryness, for example, at a temperature of about 90° to about 105° C. for about 0.1 to about 1 hour. If the reaction mass is in the form of a slurry, it may be filtered or dried to produce uncombined water and the resulting wet cake is heated to dryness as indicated above. The sodium dichloroisocyanurate particles after drying, are generally in granular form and may be utilized in this form for the sanitation of water and as a compound of laundry and bleaching compounds.

The following examples are presented to further illustrate the invention without any intention of being limited thereby. All parts and percentages are by weight unless otherwise specified. In the examples, the abbreviation CA represents cyanuric acid.

EXAMPLE 1

Sodium Carbonate

Trichloroisocyanuric acid (23.24g, 0.10 mol) was added to a crystallizing dish containing 0.05 mol of dry sodium carbonate (5.3 grams). The materials were thoroughly mixed and 5.0 mls. of $H_2O$ (0.28 mols) added while the mixture was continuously stirred. The reaction mixture was stirred occasionally during the reaction period and then allowed to set overnight. The product was dried in a force-draft oven at 100° C. for one hour and was identified as anhydrous sodium dichloroisocyanurate by infra red spectrum analysis. The yield, based on trichloroisocyanuric acid, was 21.0g (94 percent of theory). The available chlorine content was 63.8 percent.

EXAMPLE 2

Potassium Bicarbonate

Trichloroisocyanuric acid (29.05g, 0.125 mol) was placed in a crystallizing dish containing 10.01g (0.10 mol) of potassium bicarbonate. Water (5.0 ml. 0.25 mol) was added and the mixture stirred briefly. After allowing the mixture to set overnight, the product was dried in a forced-draft oven at 100° C. for one hour. The product having an available chlorine content of 64 percent, was identified as [(monotrichloro) tetra (potassium dichloro)] pentaisocyanurate by comparison of the infra red spectrum with that of a sample of [(monotrichloro) tetra (monopotassium dichloro)] pentaisocyanurate obtained commercially. Yield: 27.8g (91 percent theory based on $Cl_3CA$).

EXAMPLE 3

The procedure of Example 1 was repeated using sodium bicarbonate instead of sodium carbonate. 23.24g of trichloroisocyanuric acid, 0.10 mol of sodium bicarbonate and 5 mls. of water (0.28 mol) were admixed in the crystallizing dish with continuous stirring and then allowed to set overnight. The product was dried in a forced draft oven at 100° C. for one hour until infra red analysis of the product identified it as anhydrous sodium dichloroisocyanurate. The yield, based upon trichloroisocyanuric acid, was 90 percent of theory. The available chlorine content was 60.2 percent.

What is claimed is:

1. A process for preparing an alkali metal salt of dichloroisocyanuric acid which comprises reacting trichloroisocyanuric acid with an alkali metal carbonate in the presence of water, and recovering said alkali metal salt of dichloroisocyanuric acid produced thereby.

2. The process of claim 1 in which the molar ratio of said trichloroisocyanuric acid to the alkali metal component of said alkali metal carbonate is from about 1:0.6 to about 1:2.

3. The process of claim 2 in which the reaction temperature is in the range from about 0° C. to about 50° C.

4. The process of claim 3 in which said alkali metal is selected from the group consisting of sodium and potassium.

5. The process of claim 4 in which said alkali metal carbonate is sodium carbonate and said alkali metal salt of dichloroisocyanuric acid is sodium dichloroisocyanurate dihydrate.

6. The process of claim 4 in which said alkali metal carbonate is potassium carbonate and said alkali metal salt of dichloroisocyanuric acid is [(monotrichloro) tetra (monopotassium dichloro)] pentaisocyanurate.

7. The process of claim 4 in which said water is present in a molar ratio of said trichloroisocyanuric acid to said water of from about 1:0.2 to about 1:15.

8. The process of claim 7 in which the molar ratio of said trichloroisocyanuric acid to said alkali metal is from about 1:0.8 to about 1:1.2 and said reaction temperature is from about 20° to about 40° C.

9. The process of claim 8 in which said water is present in a molar ratio of said trichloroisocyanuric acid to said water of from about 1:0.4 to about 1:10.

10. The process of claim 9 in which said alkali metal carbonate is sodium carbonate.

11. The process of claim 9 in which said alkali metal carbonate is potassium carbonate.

12. The process of claim 9 in which said alkali metal carbonate is sodium bicarbonate.

13. The process of claim 9 in which said alkali metal carbonate is potassium bicarbonate.

14. The process of claim 9 in which said alkali metal carbonate is lithium carbonate.

15. The process of claim 9 in which said alkali metal carbonate is lithium bicarbonate.

* * * * *